United States Patent Office 3,167,760
Patented Jan. 26, 1965

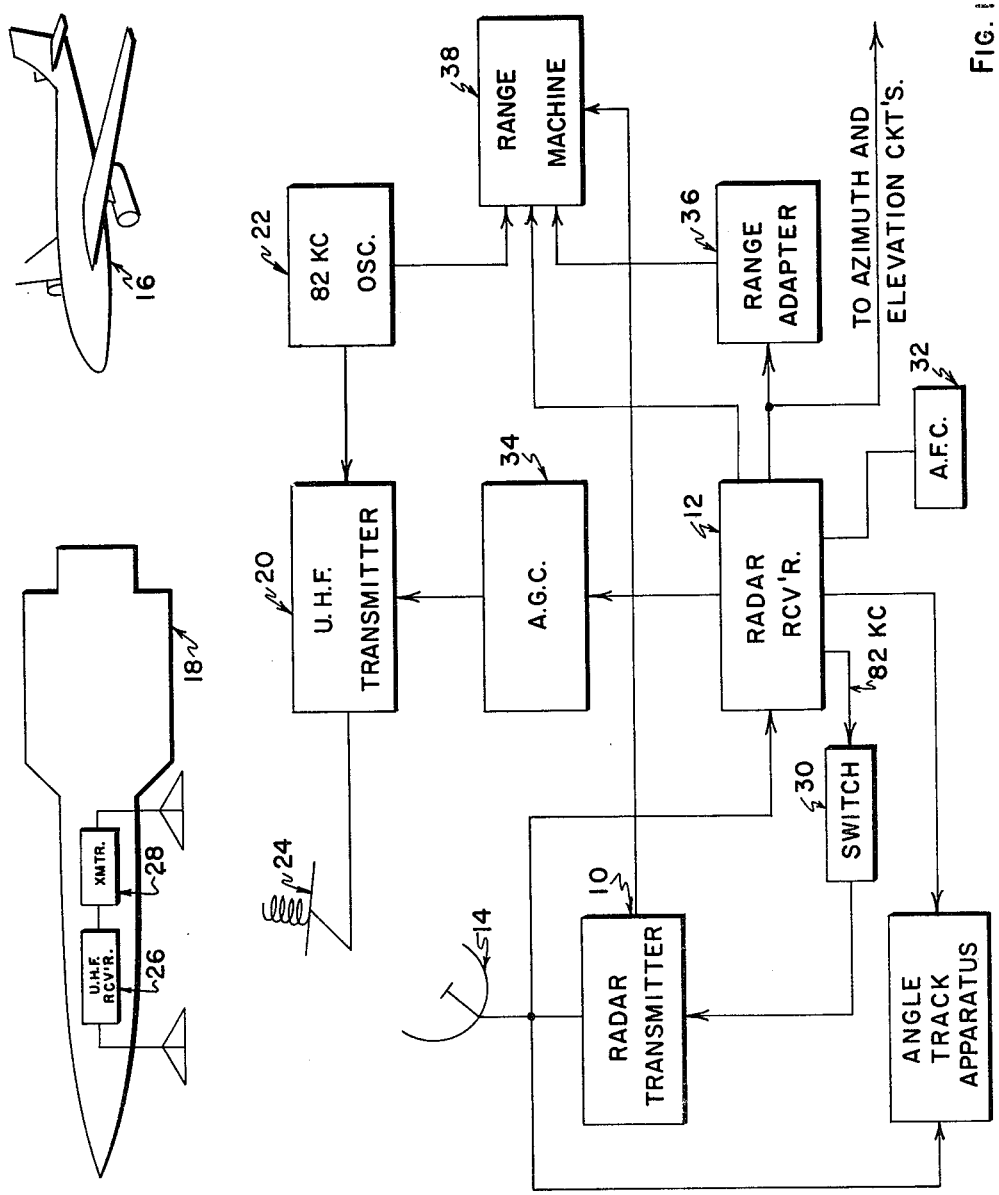

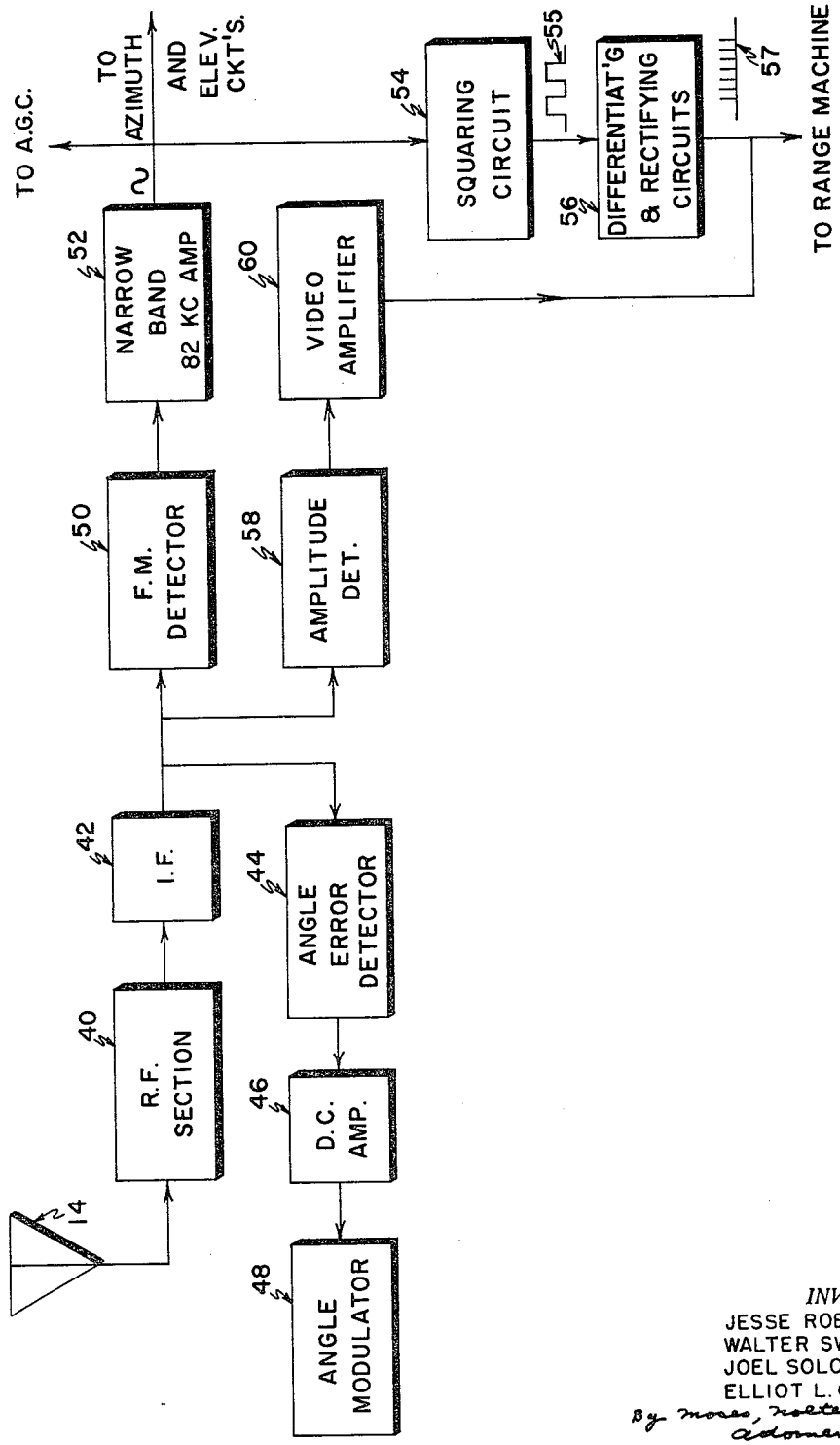

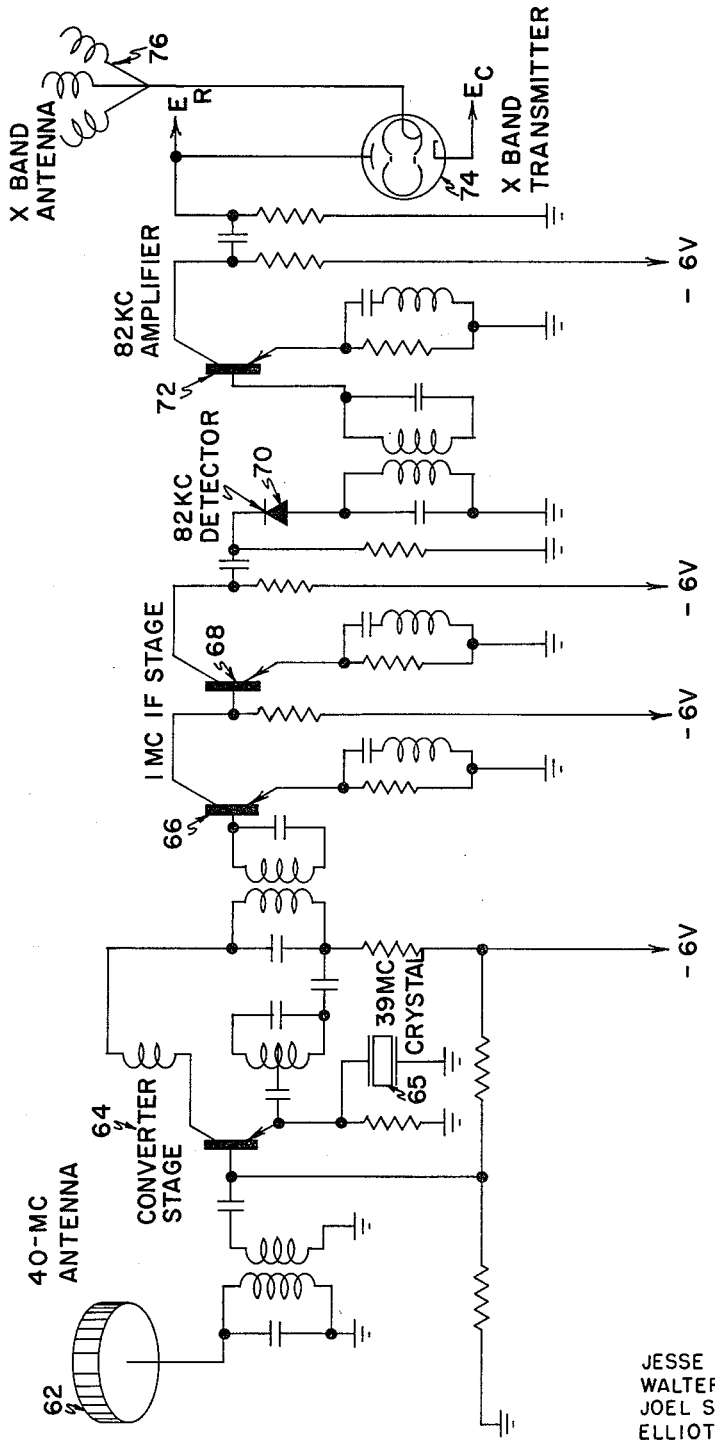

3,167,760
BEACON SYSTEM FOR TRACKING
SMALL MISSILES
Jesse R. Karp, New Rochelle, Walter Swenson, Huntington, Joel S. Spira, New York, and Elliot L. Gruenberg, Zena, N.Y., assignors to Maxson Electronics Corporation, a corporation of New York
Filed Oct. 28, 1959, Ser. No. 849,229
10 Claims. (Cl. 343—7)

The present invention relates to a radar system and particularly to a radar system including a continuous wave beacon for tracking small missiles.

Tracking small missiles such as those adapted to be launched from an aircraft presents a number of difficulties. The echo reflected by such a missile may be too small for long distance detection. The use of a pulse transponder beacon in the missile also presents problems. First, the space available in many air-to-air missiles is extremely limited. The second difficulty with the pulse repeater beacon is that there are variations of the beacon time delay. This delay must be held constant within a few millimicroseconds in order to obtain the required range accuracy. It is extremely difficult to design receiver-transmitters which can fire an oscillator stably with such dependability. Variations in the noise level of the oscillator will vary the buildup time of the oscillator, assuming a pulsed klystron or magnetron. There is also a considerable variation in delay due to changes such as those of the signal level, the filament and B voltages, temperature, and vibration. As a result, the actual delay in response of such receiver-transmitter beacons is very many times greater than that which would give the required accuracy.

Other disadvantages of the pulse beacon method are the occurrence of jitter of the pulse response, appearing as noise in the angle tracking circuits. Secondly, a wide band receiver is too bulky and the tuning drift of such receivers due to altitude, temperature changes has, in practice, proven to be very troublesome. Still another disadvantage is that the pulse forming networks, the modulators and the pulse oscillators are rather heavy. Still further disadvantages of the pulse beacon method is that it requires power supplies for the pulse systems which cannot be readily provided aboard missiles. Furthermore, isolation of the receiving and transmitting antennas is difficult in small missiles.

It is an object of the present invention to avoid or minimize the above-mentioned disadvantages. This is done according to the invention by incorporating in a radar system a continuous wave beacon system comprising a ground transmitter operating at an ultra-high or very high frequency and amplitude modulated by an oscillator which may have a frequency of say, 82 kc. The 82 kc. A.M. signal is thus transmitted to the missile by an antenna mounted on the ground. A beacon receiver is provided in the missile for receiving the carrier wave signal from the ground transmitter. The receiver derives the 82 kc. signal and uses it to modulate the frequency of a microwave transmitter which may be a klystron or a frequency variable magnetron. The frequency modulated microwave signal is then transmitted to ground where it is received by the radar receiver and used for tracking the missile. The received 82 kc. signal is used for switching off the radar transmitter so that the system then operates as a C.W. system.

Other objects and advantages of the invention will become apparent from the following description and the accompanying drawing in which:

FIG. 1 is a block diagram of a radar system according to the present invention;

FIG. 2 is a block diagram of the radar receiver; and

FIG. 3 is a circuit diagram of the airborne receiver and transmitter.

Referring to the drawing particularly, in FIG. 1 there is shown a radar system comprising radar transmitter 10 and receiver 12 connected to antenna 14. The radar system may be a conventional pulse radar or a monopulse radar system. It is adapted to transmit to an aircraft 16 and receive reflections therefrom. The aircraft is adapted to carry and launch a missile 18. The missile 18 may be of such a small size that it cannot be reliably tracked by the radar system. Accordingly, the system is provided with a transmitter 20 operating at a frequency high enough to be uninfluenced by the ionosphere. The frequency, for example, may be 40 mc. or higher and a frequency of 225 mc., for example, would be suitable. The transmitter 20 is amplitude modulated by the continuous wave signal from an oscillator 22 which may have a frequency of 82 kc. The modulated carrier wave from transmitter 20 is sent by directional antenna 24 to the missile 18 where it is picked up by the beacon receiver 26 which derives the 82 kc. signal and uses it to frequency modulate the carrier wave produced by microwave transmitter 28. Transmitter 28 may operate in the x-band, similarly to radar system 10–12.

The frequency modulated microwave signal from transmitter 28 is returned to ground and picked up by a suitable antenna which may be the antenna 14 or a separate antenna. The received signal is then supplied to radar receiver 12 which derives the 82 kc. signal. The 82 kc. signal is used to operate a switch 30 which cuts off the radar transmitter 10 so that further operation is entirely on C.W. This prevents the radar system which has been tracking the aircraft 16 from causing confusion between the tracking of the aircraft and the tracking of the missile.

The radar receiver 12 which is shown in more detail in FIG. 2 is preferably provided with suitable automatic gain control circuits and with an A.F.C. circuit 32 adapted to seize the frequency transmitted by beacon transmitter 28. The radar receiver comprises blocks 40 to 60, excluding blocks 54 to 57, and the range adapter comprises blocks 54 and 56. The radar receiver 12 is adapted also to provide the 82 kc. signal to automatic gain control circuit 34 which controls the amplitude of the modulated carrier wave produced by transmitter 20, thus enabling the system to reduce variations in amplitude of the modulated carrier signal supplied to the receiver 26 of the beacon. The output of the radar receiver 12 is fed through a range adapter 36 to a range machine 38 where it is combined with the output of the 82 kc. oscillator to provide range measurement and tracking, as is well understood in the art. The output of receiver 12 may also be supplied to suitable azimuth and elevation tracking servos through suitable adapter circuits which are not shown. One method to derive a range signal would be to feed the output of oscillator 22 into a range adapter similar to range adapter 36 at the output of radar receiver 12, so that a signal representative of the phase of the oscillator signal can be compared to the signal representative of the received signal from adapter 36. Alternatively, a range signal may be derived in the range machine 38 as explained below.

The radar receiver 12 as shown in FIG. 2 is preferably of the superheterodyne type and includes an R.F. section 40, and an I.F. section 42 provided with filters. The output of the I.F. section feeds angle tracking circuits which may include an angle error detector 44 having a D.C. coupling to a D.C. amplifier 46 and an angle modulator 48. The operation of the angle tracking operation is as follows: antenna 14 is mechanically modulated in order to scan the antenna beam so that the direction of maximum gain, or boresight, generates a cone whose axis is an average boresight of the antenna. This type of scanning is generally referred to as conical scanning. A sinusoidal signal whose instantaneous amplitude indicates instantaneous antenna pointing direction is fed to the angle-tracking apparatus shown in FIGURE 1. From this, a signal representative of the phase of the antenna may be derived. When the average position of the antenna is in the same direction as the target, or in this case the beacon, the amplitude of the signal output of radar receiver 12 will be constant. When the average direction of the antenna beam is in any other direction within approximately ½ beamwidth of the target, so that signals will be received, the amplitude of the signals derived from the radar receiver 12 will vary sinusodially at the same frequency as the conical scanning of the antenna 14. The envelope of these signals constitutes the angle-error signal. The signal representative of the phase of the antenna may be combined with the signal representative of the phase of the angle-error signal from the radar receiver, and thereby an output may be derived from the angle-track apparatus which adjusts the average direction of the antenna 14 in such a way that the angle-error at the output of radar receiver 12 will be essentially zero. That is, the conical scan modulation will be zero at the output of 12. In this way, angle tracking is accomplished.

The output of the I.F. section is also fed to an F.M. detector 50 which produces an 82 kc. signal having an amplitude proportional to the F.M. deviation and supplies it to a narrow band 82 kc. amplifier 52. The output of amplifier 52, which will vary in amplitude, is then supplied to A.G.C. circuit 34 and to other elements of the system such as azimuth and elevation servo circuits. The 82 kc. signal is also supplied to the range adapter circuit which may include a squaring circuit 54 producing an output of the form shown at 55 and to a differentiating and rectifying circuit 56 which produces sharp pulses 57, one corresponding to each cycle of the 82 kc. wave. These sharp pulses are then supplied to the range machine and are handled in the same way as the echo pulses which are supplied during normal pulse radar operation of the system. The output of the I.F. section 42 may be also supplied to the range machine through an amplitude detector 58 and a video amplifier 60. When the receiver is working on C.W. the pulses 57 override the pulses supplied by video amplifier 60. The circuit of the missile beacon as shown in FIG. 3 consists of a transistor receiver and an x-band klystron. It is assumed that the C.W. carrier frequency is 40 mc., and this is picked up by antenna 62 and supplied to the converter stage 64, the oscillator section of which may include a 39 mc. crystal 65 for causing the carrier to be heterodyned to a one mc. I.F. which is amplified by a two-stage amplifier 66–68. The I.F. is impressed on a diode detector 70 which derives the 82 kc. signal and supplies it to an amplifier 72. Amplifier 72 impresses the 82 kc. signal on the repeller plate of an x-band klystron 74 thus modulating the carrier frequency of the klystron. The frequency modulated carrier wave is then supplied to a suitable antenna 76 from whence it is transmitted to ground. The range machine 38 is an elapsed time indicator, which in normal pulsed radar operation derives a signal proportional to the time interval between the pulses transmitted by radar transmitter 10 and received by radar receiver 12. Thus, a synchronized signal from radar transmitter 10 is fed to the range machine 38 in order to start the elapsed time indicator circuit. Also, in normal radar operation, the received signal derived from amplifier 60 of FIGURE 2 stops the elapsed time indicator, and a signal representative of the total elapsed time between the starting and stopping is thereby made available from the output of the elasped time indicator contained in the range machines 38. A common form of range machine consists of a digital clock, whereby the number of unit time intervals between the transmitted and received pulses are counted, and this number determines the range to the target. Another form of range machine consists of a linear saw-tooth generator which is started in synchronization with the pulse from radar transmitter 10 and stopped by the video output due to the received signal from video amplifier 60. The voltage at the output of the linear saw-tooth generator at the final instant is proportional to the elapsed time between the transmitted and received pulses, and therefore to the range of the target.

In order to derive a range signal from the received signal when the radar transmitter 10 is shut-off by switch 30, the 82 kc. signal from the output of oscillator 22 may be fed in the range machine 38 to a binary divider with appropriate feedback. From the divider a signal may be made available which has the same recurrence frequency as radar transmitter 10, and which is synchronized with the signal from the 82 kc. oscillator 22. When the radar transmitter 10 is shut off, this signal from the 82 kc. oscillator replaces the synchronizing signal from the radar transmitter 10, and is used to start the elapsed time indicator in range machine 38. The pulse train 57 is also applied to the range machine. The normal pulse recurrence frequency for this type of radar machine may be from several hundred to a few thousand pulses per second in order to avoid ambiguous range returns. That is, when the radar range measured in nautical miles exceeds 82,000/(pulse recurrence frequency), the range of the target will not be known unambiguously. Thus, when the radar transmitter 10 is shut off, and the range signal is derived from the 82 kc., it will not be possible to derive unambiguous range information from the 82 kc. signal alone. As a result of the above relation, the unambiguous range for an 82 kc. modulation is one nautical mile. It is recalled that the output of the binary divider in the range machine 38 also starts the elapsed time indicator therein. The first pulse of pulse train 57 which is fed to the range machine 38 after the start of the elapsed time indicator will stop the elapsed time indicator in the same manner as it is stopped by a pulse from the video amplifier 60. The output of the elapsed time indicator will then indicate the range of the beacon as a fraction of one nautical mile. The course range is determined by the known range to the aircraft 16 prior to shutting off radar transmitter 10. By combining the previously known course range with the fine range derived from the 82 kc. signal in the range machine 38, the true range to the beacon may be determined immediately after launching the missile and beacon. Following this, the range to the beacon may be tracked unambiguously by means of the 82 kc. signal alone.

The operation of the system is as follows: Aircraft 16 is initially tracked by the radar system 10–12 by the reflection of echo pulses. A few minutes prior to the launching of the missile the ground transmitter 20–24 is turned on to send an amplitude modulated carrier wave to the missile. Just before launching the missile the beacon receiver-transmitter 26–28 is put into operation. The ground tracking radar receiver 12 with its A.F.C. will tune to the beacon carrier frequency. Then the 82 k.c. modulation is received and derived by the F.M. detector 50. This signal, will, through the range adapter circuits, provide a new range pulse which will override the echo pulses and seize the range tracking apparatus 38. At the same time the frequency modulated C.W. signal will take over the other radar tracking functions and will be applied to the switch 30 to turn off the radar transmitter. The radar system will then track the missile. The amplitude of the signal received by the beacon receiver 26 will determine the frequency range through which the 82 kc. signal will modulate the carrier frequency of the transmitter 28. Therefore, the output of the F.M. detector will vary in amplitude in accordance with the amplitude of the signal received by receiver 26. Through the A.G.C. circuit 34 the output of the transmitter 20 is controlled in amplitude to reduce the amplitude variations of the signals at receiver 26. This enables the beacon receiver to operate at a nearly constant level, thereby reducing the variance in phase shift of the 82 kc. signal due to amplitude changes. It also has the advantage of enabling the system to operate with no more than the necessary power so that the bad effects of spurious reflections are reduced.

Many modifications and variations of the invention will be apparent to those skilled in the art, and, accordingly, it should be understood that the invention is not to be construed as limited except as defined in the following claims.

What is claimed:

1. Apparatus for tracking an aircraft and a missile adapted to be launched therefrom, comprising a radio receiver in said missile, a frequency modulation radio transmitter in said missile connected to the output of said radio receiver for frequency modulating the output of said transmitter in accordance with the output of said receiver, a radar system for tracking said aircraft, a second transmitter for transmitting to said radio receiver, means including a constant frequency oscillator for amplitude modulating said second transmitter, a frequency modulation receiver tuned for receiving the carrier wave of the transmitter in said missile, means responsive to said last mentioned receiver for rendering the radar system inoperative, and tracking means connected to said frequency modulation receiver and said oscillator.

2. A system according to claim 1, wherein said second transmitter has an ultra-high carrier frequency and the transmitter in the missile has a microwave carrier frequency.

3. A system according to claim 1, including circuits connected to the output of said frequency modulation receiver for producing a sharp pulse in response to each cycle of the modulation output of said frequency modulation receiver, said tracking means including range measuring apparatus connected to the output of said pulse producing circuits.

4. Apparatus according to claim 1, wherein said frequency modulation receiver includes automatic frequency control means for tuning said receiver to the carrier frequency of the transmitter in the missile.

5. A system according to claim 1, including an automatic gain control circuit connected between said frequency modulation receiver and said second transmitter for controlling the amplitude of the output of said transmitter in response to the output of said frequency modulation receiver.

6. A tracking system for tracking, at a tracking station, a missile adapted to be launched from an aircraft, said system comprising, at the tracking station, a radar pulse transmitter, a radar pulse receiver, a continuous wave ultra-high frequency transmitter, means for receiving a frequency-modulated continuous wave signal, a directional antenna connected to the radar transmitter and radar receiver and connected to be effective also to receive frequency modulated signals for delivery to said receiving means, second antenna means connected to the continuous wave transmitter for transmitting to said missile, a constant frequency oscillator connected to said ultra-high frequency transmitter to amplitude modulate the continuous wave to be transmitted; and said system further comprising, on the missile, means including an ultra-high frequency receiver to receive ultra-high frequency wave signals from the transmitter at the tracking station, and a frequency modulation microwave transmitter connected to the output of said ultra-high frequency receiver, and said microwave transmitter serving to transmit a frequency modulated wave signal to be picked up by the directional antenna at the tracking station; said radar pulse transmitter and directional antenna being effective to aid in tracking the aircraft until the missile is launched, and thereafter the directional antenna functioning with the frequency modulation receiver to track the missile.

7. A system according to claim 6, including range measuring apparatus connected to said radar receiver and means connected between said radar receiver and said range measuring apparatus responsive to the frequency modulation signal at the output of said radar receiver for producing pulses of a sufficient amplitude to seize control of the range measuring apparatus even in the presence of received radar pulses.

8. Apparatus according to claim 6, including switching means responsive to the frequency modulation signal at the output of said radar receiver for rendering the radar transmitter inoperative.

9. Apparatus for tracking an aircraft and a missile adapted to be launched therefrom, comprising a radio receiver in said missile, a frequency modulation radio transmitter in said missile connected to the output of said radio receiver for frequency modulating the output of said transmitter in accordance with the output of said receiver, a radar system for tracking said aircraft, a second transmitter for transmitting to said radio receiver, means including a constant frequency oscillator for amplitude modulating said second transmitter, a frequency modulation receiver tuned for receiving the carrier wave of the transmitter in said missile, and means responsive to said last mentioned receiver for rendering the radar system inoperative.

10. Apparatus for tracking an aircraft and a missile adapted to be launched therefrom, comprising a radio receiver in said missile, a frequency modulation radio transmitter in said missile connected to the output of said radio receiver for frequency modulating the output of said transmitter in accordance with the output of said receiver, a radar system for tracking said aircraft, a second transmitter for transmitting to said radio receiver, means for amplitude modulating said second transmitter, a frequency modulation receiver tuned for receiving the carrier wave of the transmitter in said missile, and means responsive to said last mentioned receiver for rendering the radar system inoperative.

No references cited.